United States Patent
Dabrush et al.

[15] 3,678,585
[45] July 25, 1972

[54] BOW GAUGE FOR TURBINE ENGINE VANES

[72] Inventors: Charles Dabrush; Irving Strauss, both of Monsey, N.Y.

[73] Assignee: Chromalloy American Corporation, West Nyack, N.Y.

[22] Filed: Jan. 15, 1970

[21] Appl. No.: 3,185

[52] U.S. Cl..........................33/174 P, 33/174 PA, 33/174 C
[51] Int. Cl........................................G01b 3/20, G01b 5/20
[58] Field of Search.......................33/174 P, 174 PA, 174 H

[56] References Cited

UNITED STATES PATENTS 1,039,901   10/1912   Constatinescu......................33/174 E Primary Examiner—Leonard Forman
Assistant Examiner—Paul G. Foldes
Attorney—Curtis, Morris & Safford

[57] ABSTRACT

A measuring instrument for determining variations in the bow of a turbine engine vane adjacent to its trailing edge. A dial gauge is slidably mounted on the instrument and has an operating stem whose contact wheel perpendicularly engages the top surface of the trailing edge section of the vane. The contact wheel is adapted to move along a straight line which theoretically lies in the flat tangent plane of the vane airfoil at its trailing edge. The actual vane surface is bowed from this theoretical line and the dial gauge will accordingly indicate variations in the vane bow, above and below this tangent plane.

14 Claims, 5 Drawing Figures

PATENTED JUL 25 1972

INVENTORS
CHARLES DABRUSH
IRVING STRAUSS

BY
Curtis, Morris & Safford
ATTORNEYS

INVENTORS
CHARLES DABRUSH
IRVING STRAUSS
BY
Curtis, Morris + Safford
ATTORNEYS

BOW GAUGE FOR TURBINE ENGINE VANES

The present invention relates to measuring instruments and in particular to a device for measuring variations in the bow of turbine engine vanes.

Turbine engine vanes are a vital component of jet engines and their surface and edge characteristics must conform to exacting industry specifications. The dimensions of newly manufactured vanes must be carefully examined for conformity with these specifications before the vane can be used in an aircraft engine. In addition, vanes which have been in use for a period of time in a jet engine are subjected to high temperatures which causes oxidation and erosion. This oxidation and erosion causes the vanes to deteriorate requiring that the vanes be overhauled and repaired for reuse. Repair is an economic necessity and is achieved by a specialized coating process. These overhauled vanes must be shown to conform to exacting repair specifications established by the aircraft industry before they can be reused in a jet engine.

One critical dimension of these vanes is their airfoil bow, i.e., the continuous variation of the airfoil from the designed dimensions along the shortest lines, or chord widths, between the buttresses of the vane. Bow of the total airfoil does not generally occur, whereas bow of the vane's trailing edge section is commonly encountered. This is the bow, therefore, which must be measured and is the bow referred to throughout this specification.

While typically the trailing edge section of a vane should be planar, design specifications permit a limited range of bow. In production lines of both new and repaired vanes it is desirable to check the bow of each vane in a continuous one-step operation.

It is an object of this invention to measure the bow in the trailing edge section of a turbine engine vane. It is a further object of this invention to measure bow in a turbine engine vane in a continuous one-step operation. It is another object of the invention to compare the bow of a vane with a specified range of permissible bow variations. It is a still further object of the invention to provide a simple and inexpensive device for determining bow in airfoil turbine engine vanes.

In accordance with the preferred embodiment of the invention there is provided an instrument for measuring bow of a turbine engine vane's trailing edge section.

Turbine engine vanes are formed in the general shape of an airfoil and thus the curve of its trailing section, e.g., the final one quarter inch of the typical turbine engine vane's airfoil, as measured along the chord, approximates a straight line. This straight line defines an airfoil tangent plane in which the trailing edge section of the vane must lie. Typically industry specifications permit a slight bow from this plane between the buttresses of a vane.

The measuring device of this invention provides a mechanism for determining vane bow, if any, and comparing it with the established permissible range of bow. The device includes a base plate having a plurality of contact dowels positioned thereon whereby a vane may be seated on the dowels to present its trailing edge section for measurement along a generally straight line. A dial gauge support plate including a pair of spaced arms is mounted on a swivel on the base plate in such a manner that carbide contact points on each of the arms engage the trailing section of the vane. These points are spaced to be adjacent the buttresses of the vane and the line theoretically connecting these points defines the airfoil chord width for that vane. By definition, these points lie in the tangent plane against which bow is measured. A dial gauge is slidably mounted on the support plate between the contact points and has a contact wheel which is adapted to engage the surface of the vane being measured along the defined chord width. The dial indicator is calibrated to read zero when it lies on the straight line interconnecting the carbide points, i.e., the tangent plane whereby any bow in the trailing edge section of the vane will be indicated by positive or negative readings on the dial face.

The construction of the preferred embodiment as well as further objects and advantages thereof will become further apparent from the following specification when considered in conjunction with the accompanying drawings, wherein.

Figure 1:
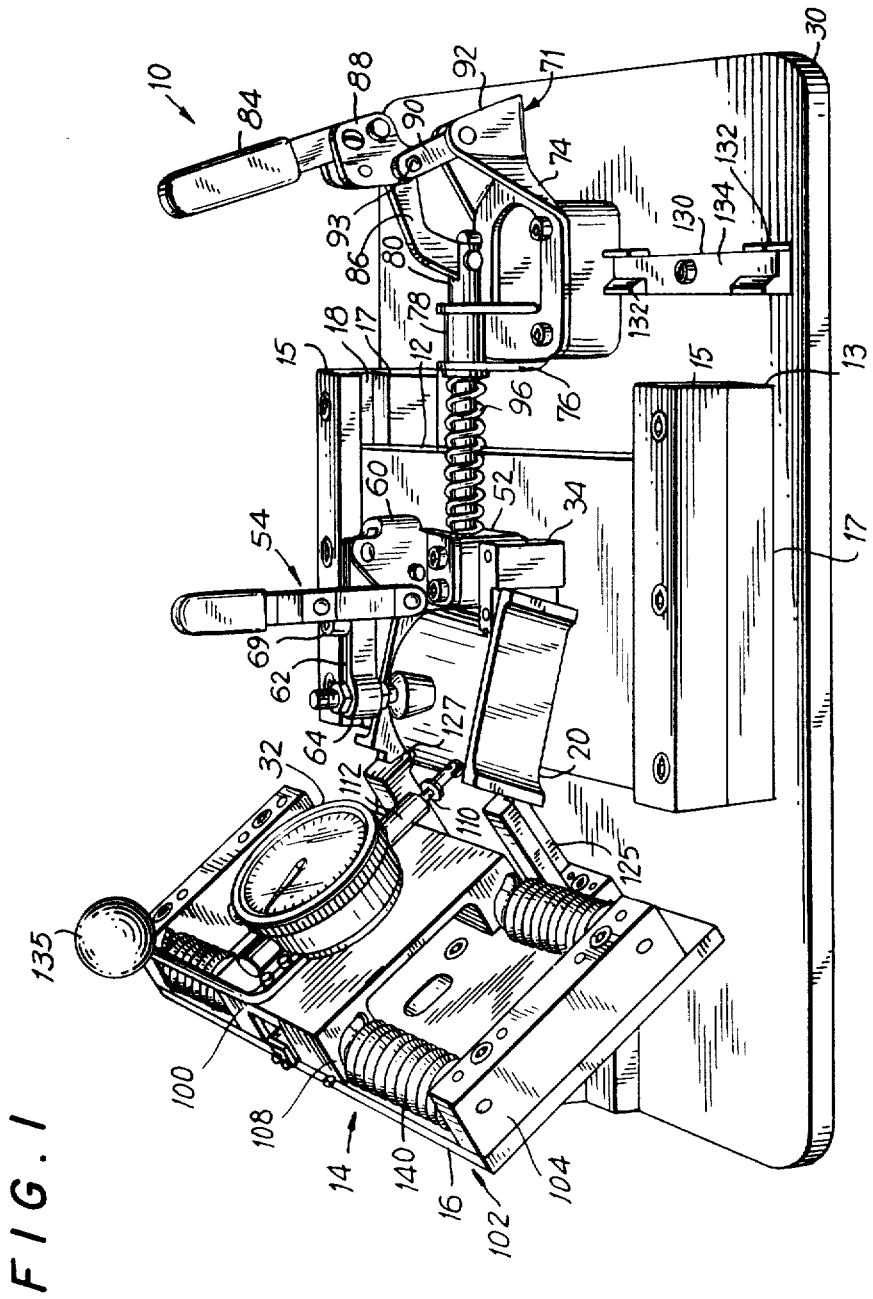
FIG. 1 is a perspective view of the measuring instrument of the present invention with a turbine vane positioned therein for measurement.

Referring now to the drawings and in particular to FIG. 1, there is shown a measuring instrument 10 having a turbine vane support platform 12 and a dial gauge assembly 14. The dial gauge is positioned to contact a turbine vane 20 whose bow is to be measured.

Figure 5:
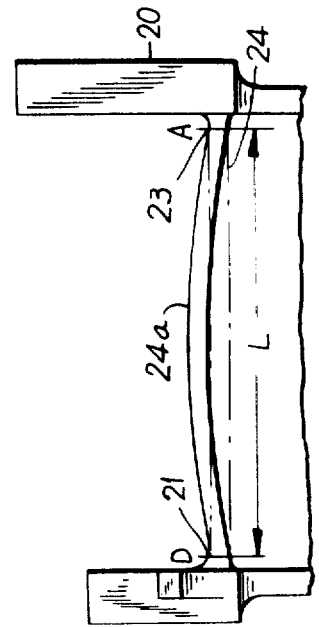
FIG. 5 is an end view of the vane taken on line 5—5 of FIG. 4.
Figure 4:
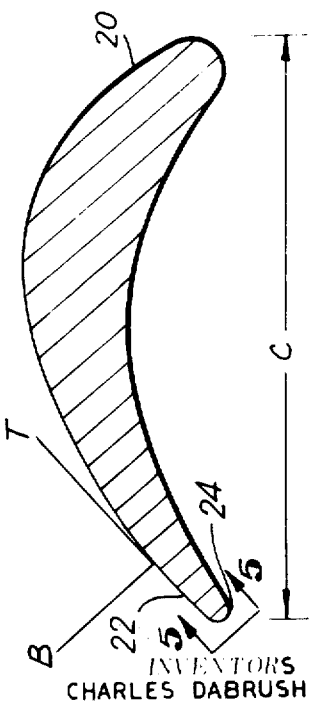
FIG. 4 is a sectional view of a typical turbine engine airfoil vane.

The bow of a turbine engine vane is defined by the continuous variation of the vanes airfoil from the designed dimensions along the shortest lines between the buttresses of the vane. These lines, L, (note FIG. 5) extend perpendicularly with respect to the chords C (note FIG. 4) of the vane, and are referred to as chord widths. Specifically, the chord widths along which bow is defined are those extending between the chord sections A—A and D—D adjacent the roots 21 and 23, of the vane buttresses. Generally, total airfoil bow, i.e., bow along the entire surface of the vane, is not encountered. The most common condition is bow at the trailing edge of the vane. Thus bow at the trailing edge is the vane bow which must be measured and is the bow referred to hereinafter. As seen in FIG. 4, the top surface of the trailing edge 22 of a typical turbine engine airfoil vane 20 is approximately a flat section. This section is used to define a tangent plane T in which the trailing edge chord widths theoretically lie. Thus the vanes trailing edge 24 is theoretically a straight edge, as shown in broken line in FIG. 5. However, as noted above, due to errors in manufacture or the use and repair of a vane, deviation, i.e., bow, from this tangent plane occurs and the actual trailing edge may appear curved, as illustrated at 24a in FIG. 5.

Figure 2:
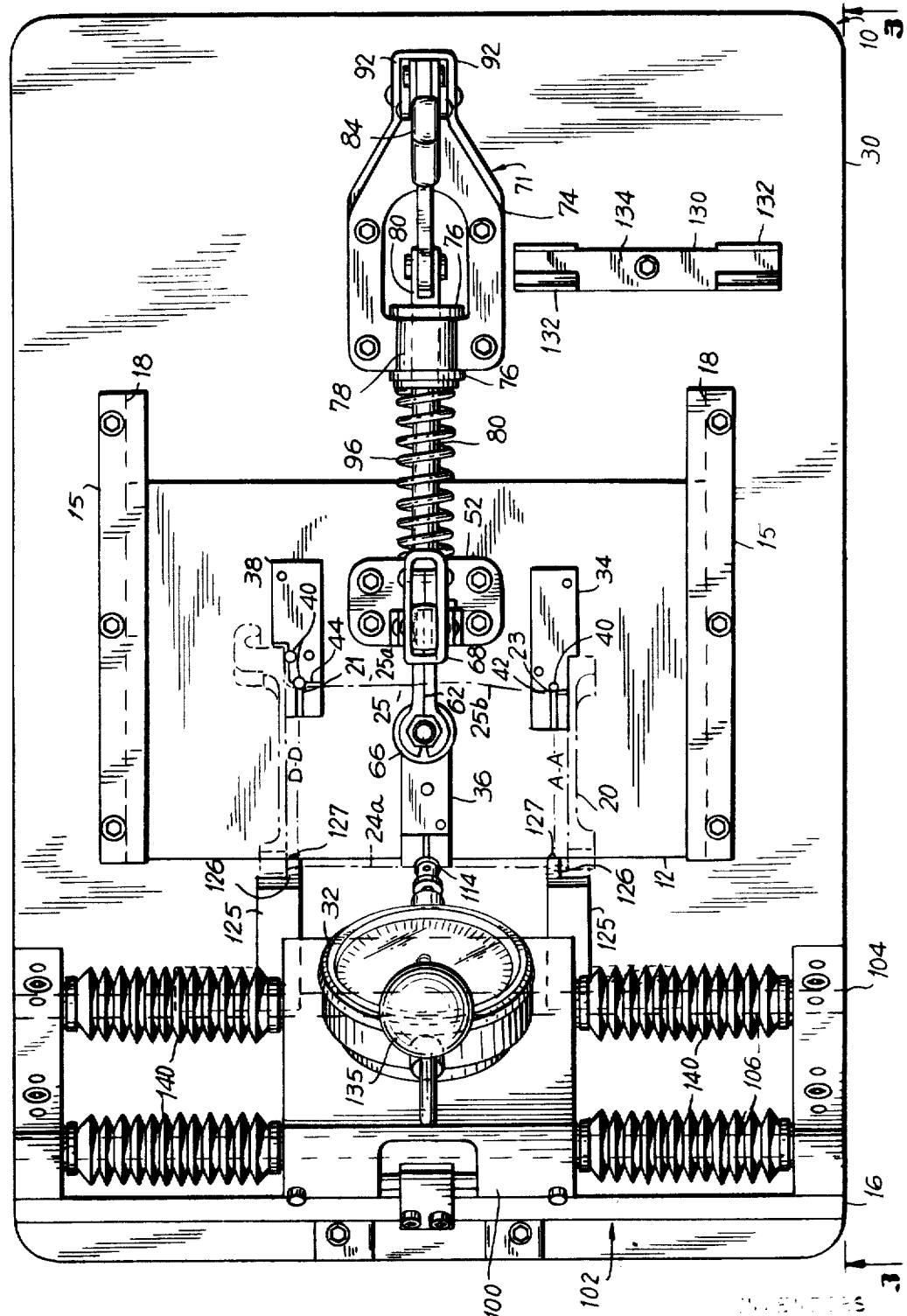
FIG. 2 is a top plan view of the instrument illustrated in FIG. 1, with the turbine vane shown by phantom lines.
Figure 3:
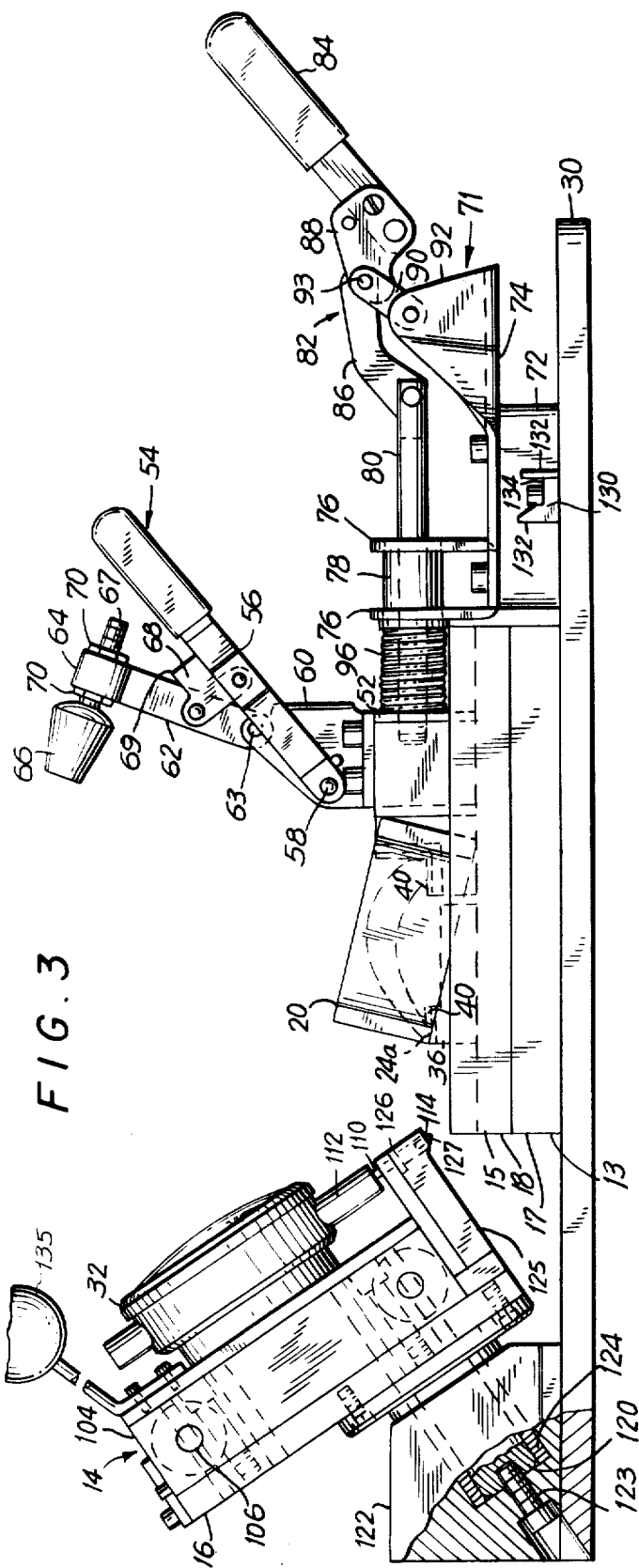
FIG. 3 is a side view taken on line 3—3 of FIG. 2, but with the retaining clamp open and the vane support platform moved away from the dial gauge.

The instrument 10 illustrated in FIGS. 1–3 is provided to permit accurate and continuous measurement of the deviation of the entire trailing edge 24a from its theoretical location 24. Bow measurements are most conveniently made in a plane B which is perpendicular to the theoretical tangent plane T, and extends through a line lying in that plane. In this manner, variations above and below the tangent plane T, and whether these variations lie within the permissible design specification range, can be determined.

Measuring instrument 10 includes a base plate 30 on which is mounted the vane support platform 12 and gauge assembly 14. A dial gauge 32 is slidably mounted on platform 16 of assembly 14 by structure which will be more fully described hereinafter, so that its contact wheel 114 can move along a straight line path in plane B, corresponding to the straight line chord width L and thus measure the variations in the vane with respect to the tangent plane T.

Vane 20 is supported on platform 12 by three support blocks 34, 36 and 38. Blocks 34, 36 and 38 are fixed in position on platform 12 and each include a plurality of carbide contact dowels 40. These blocks are spaced to provide a three-point support for vane 20 with one support 36 at the trailing edge 24a and the other supports 34 and 38, adjacent buttress roots 21 and 23 on leading edge 25. In this manner, sections A—A and D—D, which define the chord widths along which bow is measured, are located.

As seen in FIG. 2, the vertical faces 42 and 44, of blocks 34 and 38 respectively, are offset with respect to each other. This position is due to the fact that leading edge 25 of vane 20 is formed with a pair of angularly related sections 25a and 25b which, as seen in FIG. 2 cause the inner ends of buttress roots 21 and 23 to be offset. Accordingly, in order to position trailing edge 24a along a straight line parallel to the path of dial gauge 32, the vertical faces 42 and 44 of blocks 34 and 38 are offset a sufficient distance to compensate for the offset of points 21 and 23. It should be clear that trailing edge 24a must be parallel to the path of dial gauge 32 so that the gauge takes measurements along the straight line chord width L, which is parallel to the theoretically straight trailing edge 24.

The horizontally extending carbide contact dowels 40 serve to maintain the vertical attitude of the vane 20 in the proper position for engagement by gauge 32. It is noted that block 36 supports the under surface of trailing edge 24a and does not interfere with the operation of the dial gauge assembly 14. In addition, it is noted that all of the contact dowels 40 are cylindrical so that there is minimum contact between vane 20 and its support members; thereby minimizing the possibility of damage to vane 20.

Located between support blocks 34 and 38 on platform 12 is a mounting block 52 which provides support for a conventional break back clamp 54. Clamp 54 includes a bifurcated handle 56 pivoted at 58 to a mounting piece 60 which is bolted on block 52. One of the links, 62, of clamp 54, is pivotally connected at 63 to member 60 and serves as a clamping arm to hold vane 20 on support blocks 34, 36 and 38, in order to maintain the vane's position relative thereto. The free end of arm 62 includes an enlarged portion 64 having a bore or opening therein for receiving clamp contact member 66. Member 66 is adjustably mounted by its threaded stem 67 and nuts 70 in the bore in order to provide a control for the amount of clamping pressure applied to vane 20. In addition, member 66 is formed of rubber, or any equivalent cushioning material, in order to prevent damage to the upper surface of vane 20.

As clearly seen in FIGS. 1 and 3, the third link 68 of break back clamp 54, is a generally U-shaped member pivotally interconnecting links 54 and 62. Link 68 has a bight position 69 which bears against the top surface of link 62 when the clamp is closed to assist in applying downward pressure on vane 20. It is thus seen that vane 12 may be firmly positioned by a relatively simple mechanism for presenting its trailing edge to assembly 14 for measurement.

In order to facilitate insertion and removal of vane 20 from the measuring station adjacent gauge assembly 14, the platform 12 is slidably mounted in blocks 13. As seen in FIG. 1, support blocks 13 are formed of upper and lower members 15 and 17, respectively. Member 15 is formed as an inverted L-shaped element and is bolted to the wider base member 17. In this manner members 15 and 17 define slots 18 which slidably receive the opposed ends of platform 12.

While platform 12 may be moved manually, a relatively simple displacement device 71 is provided to facilitate the measuring operation. Displacement device 71 includes a base member 72 which supports a base plate 74. Plate 74 provides support for a journal tube 78 which is fixed between a pair of support ears 76. A thrust rod 80 is inserted through tube 78 and has one end threadably engaged in clamp support block 52. Rod 80 is adapted to be slid in tube 78 by toggle linkage 82 and handle 84. Linkage 82 includes first link 86 pivoted at one end to rod 80, second link 88 fixed at one end to handle 84 and third link 90 pivoted to ears 92 of plate 74. All three links 86, 88 and 90 are interconnected at a common point 93. It is thus seen that by actuation of handle 84 and rod 80 platform 12 may be moved toward and away from gauge 32.

A compression spring 96 may be provided around rod 80, in displacement device 71, in bearing relation between block 52 and opposed ear 76 to bias platform 12 towards gauge 32. FIG. 1 illustrates displacement device 71 in the closed position with platform 12 and vane 20 in the attitude required for the bow measuring operation. In FIG. 3 platform 12 and vane 20 are shown withdrawn from gauge 32 against the action of spring 96. It should be clear that conventional stop means may be provided in slots 18 or on displacement means 71 to limit the lateral movement of plate 12 in the direction of gauge 32.

Dial gauge assembly 14 includes a dial gauge support platform 100 slidably mounted on plate 16. Platform 100 is mounted to slide on a support system 102 in a plane which extends perpendicular to the tangent plane T of a turbine vane placed in position for measurement. Support system 102 includes a pair of end blocks 104 in which are mounted a pair of parallel cylindrical rods 106. Platform 100 includes a pair of integral depending bearing structures 108 which have longitudinally extending bores therein for receiving rods 106. In this manner platform 100 can slide parallel to vane 20.

Dial gauge 32 is fixed on platform 100 by any convenient fastening means. The gauge illustrated in the drawings is of conventional construction and includes an operating stem 110 which slides in a collar 112. Stem 110 is also provided with a rolling contact wheel 114 at its free end which is adapted to engage the top surface of vane 20 during the bow measuring operation. Since stem 110 is positioned parallel to platform 100 and plate 16, it too lies in a plane perpendicular to tangent plane T, and, in this manner contact wheel 114 can follow the contours of vane 20 and effect an indication of bow variations of the vane on the face of dial 32.

As most clearly seen in FIG. 3, the entire dial gauge assembly 14 is pivotally mounted for movement about an axis which is substantially parallel to the tangent plane T. This pivotal mounting is required for proper location of plane T as will be more fully explained hereinafter.

Pivot pin 120 is fixed at one end at the rear of plate 16 and is journaled at its opposed end in the support block 122. Journal tube 124 in block 122 facilitates pivoting of plate 16 and assembly 14 with respect to block 22 and support platform 12. As seen in FIG. 3, a bolt 123 is journaled in block 122 along a line corresponding to the axis of rotation of shaft 124 and the free end of bolt 123 is threadably engaged with the free end of shaft 124, thus preventing inadvertent disassembly of the device.

Plate 16 is further provided with a pair of spaced vane contact arms 125 which extend outwardly therefrom. The free ends 126 of arms 125 include carbide contact points 127 which engage the top surface of vane 20. Since both points must contact the top surface of vane 20, the pivotal mounting of assembly 16 insures proper seating thereof. Points 127 are laterally spaced at a distance equal to the chord width L extending between buttress roots 21 and 23 and chord sections A—A and D—D. The positions of support block 122 and the carbide contacts 40 on support plate 12 are such that when vane 20 is moved into the measuring position points 127 engage the top surface of vane 20 at sections A—A and D—D.

As previously noted the trailing edge section is defined as a flat section lying in a flat tangent plane T. Since the thickness of vane 20, and thus the specific locations in space of the top surfaces of sections A—A and D—D, is immaterial for bow measurement, when the carbides 127 are positioned against the airfoil, as seen in FIGS. 1 and 2, they define the theoretical straight airfoil chord width, or line L, lying in tangent plane T along which bow is to be measured. Thus the pivotal mounting of gauge assembly 16 is critical in order that points 127 properly seat on vane 20 to compensate for variations in vane thickness or the respective vertical locations of sections A—A and B—B.

Prior to measuring bow, however, dial gauge 32 must be calibrated. A calibration block 130, illustrated in its storage position in FIG. 1, is provided on plate 30 for this purpose. Block 130 includes a pair of tabs 132 at each end which are adapted to be friction fit on the free ends 126 of arms 125. The upper surface 134 of block 132 is adapted to contact points 127 and since points 127 define the chord width L and tangent plane T, this surface will lie in the theoretical plane of the vane's trailing edge section. Therefore, by engaging contact wheel 114 with surface 134, the location of tangent plane T of the class of vanes being checked is correlated with the dial gauge, and the dial indicator may then be set at zero. In this manner, when vanes are later checked, the location of their actual trailing edge is compared to its established theoretical location, i.e., tangent plane T, and any reading of zero on the actual vane would indicate a point at which no bow exists. Any reading below zero is negative bow and above zero is positive bow. The acceptable range of bow defined by design specifications can be clearly indicated by a green zone on the dial face whereas bow which exceeds design limits is indicated by a red zone on the dial face.

To facilitate sliding of platform 100 on rods 106, a vertically extending handle 135 is provided. Arms 125 act as stop members and thus limit the traverse of gauge 32 and stem 110 to the extent of chord length L. In addition, flexible dust covers 140 are provided on each side of platform 100 on rods 106 to prevent dirt or other possibly deleterious matter from interfering with the smooth sliding motion of platform 100.

The process for measuring the vanes is as follows: Calibration block 130 is positioned on the free ends 126 of arms 125 with its top surface 134 in engagement with carbide contacts 127. Contact wheel 114 is permitted to engage surface 134 and the dial indicator of gauge 32 is set at zero. Calibration block 130 is then returned to its storage position and handle 84 is operated to slide platform 12 away from the gauge. Vane 20 is then seated on supports 34, 36 and 38 and the clamp 54 is closed to fix vane 20 in its proper position on contact dowels 40. Handle 84 is then released to slide platform 12 and vane 20 into position adjacent gauge 32 and contacts 127. Contact wheel 114 is engaged with the top surface of the trailing edge of vane 20 and platform 100 is slid along rods 106, permitting gauge 32 to take a continuous reading of bow along the chord width L. Any reading beyond the acceptable range indicated on the dial face of gauge 32 will indicate excessive bow and, thus, rejection of that particular vane.

The above description of the invention is intended to be illustrative only, and various changes and modifications in the embodiment described may occur to those skilled in the art. These changes may be made without departing from the scope of the invention, and thus it should be apparent that the invention is not limited to the specific embodiments described or illustrated in the drawings.

What is claimed is:

1. An apparatus for determining variations in bow of an air foil vane having a trailing edge section defined as lying in a theoretically flat plane tangential to the curve of an air foil between the end buttress roots of the vane, comprising, a base, means for establishing the location of said theoretically flat plane including means for supporting the vane with its trailing edge section in the established flat plane, a support member pivotally mounted on said base and having a pair of fixed spaced arm means each having a contact point adapted to contact said vane adjacent its buttress roots, said arm means contact points defining a straight line, said support member being pivotally mounted on an axis perpendicular to said line whereby said plane is established and said straight line is located in said theoretically flat tangent plane, and indicator means having a vane contacting element, said indicator means slidably mounted on said support member, between said arm means, on a line parallel to the line connecting said points, for determining variations of said vane trailing edge section form said theoretically flat plane.

2. The apparatus as defined in claim 1 wherein said indicator means comprises a dial gauge.

3. The apparatus as defined in claim 2 wherein said means for supporting said vane comprises a plurality of vane support blocks having contact dowels mounted thereon, said dowels being so positioned and arranged as to position said vane adjacent said dial gauge for contact by said arm means whereby said flat plane is established.

4. The apparatus as defined in claim 3 including means for clamping said vane in position on said support blocks.

5. The apparatus as defined in claim 3 including means supporting said support blocks for lateral movement with respect to said dial gauge whereby said vane may be readily positioned on said blocks.

6. The apparatus as defined in claim 2 including means for calibrating said dial gauge.

7. An apparatus for measuring variations in the bow of an airfoil vane having a trailing edge section defined as a flat plane tangential to the curve of the airfoil vane comprising, a base support plate, a vane support plate slidably mounted on said base plate and having a plurality of vane contact dowels mounted thereon for supporting said vane in position for bow measurement, a gauge support plate having a pair of spaced arm means having contact points for engaging said vane adjacent its buttress roots, said arm means defining a straight line between their respective contact points, said plate being pivotally mounted on said base plate for rotation about an axis extending perpendicular to said line whereby said flat tangential plane is established and said straight line is located in said tangential plane, and gauge means slidably mounted on said gauge support plate between said arms for determining variations of the trailing edge section of a vane supported on said dowels from said established tangential plane.

8. The apparatus as defined in claim 7 wherein said gauge means comprises a dial gauge having a sliding operating stem and said contacting means comprises a vane contact wheel operatively associated with the free end of said stem, whereby as said gauge means is moved between said arms, said contact wheel moves said stem in response to variations in bow thereby to indicate variations in the actual location of the trailing edge section with respect to said established flat tangential plane.

9. The apparatus as defined in claim 8 including means for calibrating said dial gauge.

10. The apparatus as defined in claim 8 wherein said dial gauge is calibrated and includes a dial face and indicator means, said face having indicia thereon to indicate the acceptable range of bow with respect to said flat plane.

11. The method of determining bow in an airfoil vane having a theoretically flat trailing edge section lying in a plane tangential to the curve of the airfoil, comprising the steps of, establishing the location of a straight line chord width of said vane in said theoretically flat plane, and continuously determining the variations of the actual position of the surface of the theoretically flat trailing edge section of a vane with respect to said established theoretically flat plane by measuring the variation of the actual position of the surface of said trailing edge section along and from the location of said straight line chord width lying in the established theoretically flat plane.

12. The method as described in claim 11 wherein said step of determining includes the steps of, moving a dial gauge along said chord width in a plane perpendicular to said established theoretically flat plane whereby the operating stem of said gauge operatively engages said vane surface to provide a continuous indication on the dial gauge of said vane's bow.

13. The method as described in claim 12 including the step of, calibrating said dial gauge to read zero when a point lying on said established theoretically flat plane is contacted.

14. The method as described in claim 13 including the steps of, calibrating said dial gauge and providing said dial face with a suitable indicia thereon to indicate variations from the acceptable range of vane bow.

* * * * *